(12) United States Patent
Long et al.

(10) Patent No.: US 12,457,042 B2
(45) Date of Patent: Oct. 28, 2025

(54) QUANTUM SECURE DIRECT COMMUNICATION METHOD AND APPARATUS BASED ON ONE-WAY TRANSMISSION, DEVICE AND SYSTEM

(71) Applicant: Beijing Academy of Quantum Information Sciences, Beijing (CN)

(72) Inventors: Guilu Long, Beijing (CN); Dong Pan, Beijing (CN); Penghao Niu, Beijing (CN); Haoran Zhang, Beijing (CN); Feihao Zhang, Beijing (CN); Min Wang, Beijing (CN); Chao Zheng, Beijing (CN); Xiuwei Chen, Beijing (CN)

(73) Assignee: Beijing Academy of Quantum Information Sciences, Beijing (CN)

( * ) Notice: Subject to any disclaimer, the term of this patent is extended or adjusted under 35 U.S.C. 154(b) by 275 days.

(21) Appl. No.: 18/125,840

(22) Filed: Mar. 24, 2023

(65) Prior Publication Data
US 2024/0322914 A1    Sep. 26, 2024

(51) Int. Cl.
*H04B 10/70* (2013.01)
*G06N 10/70* (2022.01)
*G06N 10/00* (2022.01)
*H04L 9/08* (2006.01)

(52) U.S. Cl.
CPC ............ *H04B 10/70* (2013.01); *G06N 10/70* (2022.01); *G06N 10/00* (2019.01); *H04L 9/0852* (2013.01)

(58) Field of Classification Search
CPC ...... H04L 9/0852; H04B 10/70; G06N 10/70; G06N 10/00
See application file for complete search history.

(56) References Cited

U.S. PATENT DOCUMENTS

| | | | | |
|---|---|---|---|---|
| 2024/0048371 A1* | 2/2024 | Long | ............... | H04B 10/29 |
| 2024/0267133 A1* | 8/2024 | Ahn | ............... | H04L 9/001 |
| 2025/0038845 A1* | 1/2025 | Ahn | ............... | H04B 10/85 |

FOREIGN PATENT DOCUMENTS

| | | | | |
|---|---|---|---|---|
| CN | 106027232 A | * 10/2016 | ............ | H04L 43/08 |
| CN | 108650029 A | 10/2018 | | |
| CN | 112217638 A | 1/2021 | | |
| CN | 112600666 A | 4/2021 | | |
| CN | 113612601 A | 11/2021 | | |

OTHER PUBLICATIONS

Deng, et al., "Quantum Secure Direct Communication", Journal of Beijing Normal University (Natural Science), 2016, pp. 790-799.

* cited by examiner

*Primary Examiner* — Ellen Tran
(74) *Attorney, Agent, or Firm* — Dorsey & Whitney LLP

(57) ABSTRACT

The present application relates to a quantum secure direct communication method and apparatus based on a one-way transmission, a device and a system. The transmitting terminal performs the error-correction anti-loss encoding on the to-be-transmitted message to obtain the code word corresponding to the to-be-transmitted message. The encryption key negotiated with the receiving terminal is adopted to encrypt the code word and the ciphertext message corresponding to the code word is obtained. Further, the ciphertext message is encoded onto the quantum state, and the obtained quantum state information is transmitted to the receiving terminal through the quantum channel.

20 Claims, 10 Drawing Sheets

QUANTUM SECURE DIRECT COMMUNICATION METHOD AND APPARATUS BASED ON ONE-WAY TRANSMISSION, DEVICE AND SYSTEM

TECHNICAL FIELD

The present disclosure relates to the field of quantum communication technology, and particularly to a quantum secure direct communication method and apparatus based on a one-way transmission, a device and a system.

BACKGROUND

Quantum communication has attracted wide attention because of its high security process. At present, the research on the quantum communication mainly focuses on three hot directions, including: quantum secure direct communication (QSDC), quantum key distribution (QKD), quantum secret sharing (QSS). As for the quantum key distribution and quantum secret sharing, keys are transmitted through quantum channels, and encrypted data is transmitted through classical data transmission channels. As for the quantum secure direct communication, confidential information is transmitted directly through the quantum channels.

In order to ensure the security of data transmission, the two-way transmission method can be used in the quantum secure direct communication. Bob first manufacture a batch of quantum states and transmits them to Alice through quantum channels. Alice randomly selects some quantum states to perform eavesdropping detection. Under the condition that the eavesdropping detection result indicates that the quantum channels are secure, Alice encodes the message to be transmitted and transmits the encoded information to Bob through the remaining quantum states.

Using the above-mentioned two-way transmission method, the quantum state loss in the quantum secure direct communication is larger and the transmission distance is short.

SUMMARY

In order to address the above technical problems, the present disclosure provides a quantum secure direct communication method and apparatus based on a one-way transmission, a device and a system, which can improve the transmission distance of the quantum secure direct communication.

In the first aspect, a quantum secure direct communication method based on a one-way transmission is provided, which is applied to a transmitting terminal in a quantum communication system, and includes:
  performing error-correction anti-loss encoding on a to-be-transmitted message, and obtaining a code word corresponding to the to-be-transmitted message;
  encrypting the code word by using an encryption key negotiated with a receiving terminal, and obtaining a ciphertext message corresponding to the code word; and
  encoding the ciphertext message onto a quantum state, and transmitting quantum state information obtained to the receiving terminal through a quantum channel.

In an embodiment, before encoding the ciphertext message onto the quantum state, the method further includes:
  performing mask processing on the ciphertext message by using a local random number, and obtaining a to-be-transmitted code word corresponding to the ciphertext message, the local random number and the ciphertext message having the same length.

The encoding the ciphertext message onto the quantum state and transmitting the quantum state information obtained to the receiving terminal through the quantum channel includes:
  encoding the to-be-transmitted code word onto the quantum state, and transmitting the quantum state information obtained to the receiving terminal through the quantum channel.

In an embodiment, after transmitting the quantum state information obtained to the receiving terminal through the quantum channel, the method further includes:
  acquiring a trigger bit timing sequence position exposed by the receiving terminal, the trigger bit timing sequence position being a timing sequence position where the receiving terminal measures the quantum state transmitted through the quantum channel and obtains the quantum state information;
  determining a target timing sequence position in the trigger bit timing sequence position, the target timing sequence position being a timing sequence position where a base vector used by the transmitting terminal to encode the to-be-transmitted code word is the same as a base vector used by the receiving terminal to receive the measured quantum state information; and
  performing an eavesdropping detection on the quantum channel based on the target timing sequence position.

In an embodiment, the performing the eavesdropping detection on the quantum channel based on the target timing sequence position includes:
  acquiring a decoding result corresponding to a partial timing sequence position of the target timing sequence position exposed by the receiving terminal;
  comparing a to-be-transmitted bit of the partial timing sequence position to the decoding result of the partial timing sequence position, and calculating a bit error rate of the quantum channel;
  determining, when the bit error rate is greater than a preset threshold, the eavesdropping detection of the quantum channel to fail; and
  determining, when the bit error rate is less than the preset threshold, the eavesdropping detection of the quantum channel to pass.

In an embodiment, the determining the target timing sequence position in the trigger bit timing sequence position includes:
  acquiring a first base vector exposed by the receiving terminal and used when receiving quantum state information corresponding to the trigger bit timing sequence position;
  comparing a second base vector used when encoding the to-be-transmitted code word corresponding to the trigger bit timing sequence position to the first base vector; and
  determining a timing sequence position where the first base vector is the same as the second base vector as the target timing sequence position.

In an embodiment, after passing the eavesdropping detection, the method further includes:
  exposing a sub-random number corresponding to the trigger bit timing sequence position in the local random number to the receiving terminal, the sub-random number being configured to perform, by the receiving terminal, an unmasking processing on the decoding result corresponding to the trigger bit timing sequence position.

In an embodiment, the encrypting the code word by using the encryption key negotiated with the receiving terminal and obtaining the ciphertext message corresponding to the code word includes:
extracting an encryption key with the same length as the code word from a preset key pool, and performing one-time pad encryption processing on the code word.

In an embodiment, the method further includes:
returning an encryption character corresponding to a non-trigger bit timing sequence position except the trigger bit timing sequence position and configured to encrypt the error-correction anti-loss encoding code word in the encryption key to the key pool.

In an embodiment, the method further includes:
inputting the ciphertext message corresponding to the target timing sequence position into a preset key generation algorithm to obtain a supplementary key; and
adding the supplementary key into the preset key pool.

In an embodiment, the performing the error-correction anti-loss encoding on the to-be-transmitted message and obtaining the code word corresponding to the to-be-transmitted message includes:
performing error-correction encoding processing with a preset error correction algorithm on the to-be-transmitted message; and
performing spread spectrum processing on the to-be-transmitted message after the error-correction encoding processing, and obtaining the code word corresponding to the to-be-transmitted message.

In the second aspect, a quantum secure direct communication method based on a one-way transmission is provided, which is applied to a receiving terminal in a quantum communication system, and includes:
receiving quantum state information transmitted by a transmitting terminal through a quantum channel, the quantum state information referring to information encoded onto a quantum state after performing the error-correction anti-loss encoding and the encryption on the to-be-transmitted message by the transmitting terminal; decoding the quantum state information to obtain a decoding result;
performing decryption processing on the decoding result by using an encryption key negotiated with the transmitting terminal, and obtaining a decrypted message corresponding to the decoding result; and
performing transcoding processing corresponding to the error-correction anti-loss encoding on the decrypted message, and obtaining a transmission message corresponding to the decrypted message.

In an embodiment, the receiving the quantum state information transmitted by the transmitting terminal through the quantum channel includes:
measuring the quantum state transmitted through the quantum channel according to a preset time window, and obtaining the quantum state information.

In an embodiment, the quantum state information is encoded onto the quantum state after the transmitting terminal performs a mask processing on the to-be-transmitted message with a local random number, and the method further includes:
acquiring a sub-random number corresponding to a trigger bit timing sequence position returned by the transmitting terminal, wherein the sub-random number refers to a partial numerical value corresponding to the trigger bit timing sequence position in the local random number determined by the transmitting terminal, and the trigger bit timing sequence position refers to a timing sequence position where the quantum state information is detected; and
performing the unmasking processing on the decoding result corresponding to the trigger bit timing sequence position with the sub-random number.

In an embodiment, the method further includes:
copying the decoding result corresponding to the target timing sequence position to obtain an initial code, wherein the target timing sequence position refers to a timing sequence position where a base vector used by the transmitting terminal to encode the to-be-transmitted code word is the same as a base vector used by the receiving terminal to receive the measured quantum state information;
inputting the initial code into a preset key generation algorithm to obtain a supplementary key; and
adding the supplementary key into a preset key pool.

In the third aspect, a quantum secure direct communication apparatus based on a one-way transmission is provided, which is applied to a transmitting terminal in a quantum communication system, and includes:
a first encoding module, configured to perform error-correction anti-loss encoding on a to-be-transmitted message and obtain a code word corresponding to the to-be-transmitted message;
an encryption module, configured to encrypt the code word with an encryption key negotiated with a receiving terminal and obtain a ciphertext message corresponding to the code word; and
a second encoding module, configured to encode the ciphertext message onto a quantum state and transmit quantum state information obtained to the receiving terminal through a quantum channel.

In the fourth aspect, a quantum secure direct communication apparatus based on a one-way transmission is provided, which is applied to a receiving terminal in a quantum communication system, and includes:
a receiving module, configured to receive quantum state information transmitted by a transmitting terminal through a quantum channel, wherein the quantum state information refers to information encoded onto the quantum state after performing the error-correction anti-loss encoding and an encryption on the to-be-transmitted message by the transmitting terminal;
a decoding module, configured to decode the quantum state information to obtain a decoding result;
a decryption module, configured to perform decryption processing on the decoding result by using an encryption key negotiated with the transmitting terminal, and obtain a decrypted message corresponding to the decoding result; and
a transcoding module, configured to perform transcoding processing corresponding to the error-correction anti-loss encoding on the decrypted message, and obtain a transmission message corresponding to the decrypted message.

In the fifth aspect, a communication device is provided, including a processor and a memory for storing a computer program, the processor, when executing the computer program, implements the method in the first aspect.

In the sixth aspect, a communication device is provided, including a processor and a memory for storing a computer program, the processor, when executing the computer program, implements the method in the second aspect.

In the seventh aspect, a communication system is provided, including a transmitting terminal and a receiving terminal, the transmitting terminal is the communication device in the fifth aspect, and the receiving terminal is the communication device in the sixth aspect.

In the above quantum secure direct communication method and apparatus based on the one-way transmission, the device and system, the transmitting terminal performs the error-correction anti-loss encoding on the to-be-transmitted message to obtain the code word corresponding to the to-be-transmitted message, and the encryption key negotiated with the receiving terminal is adopted to encrypt the code word and the ciphertext message corresponding to the code word is obtained. Further, the ciphertext message is encoded into the quantum state, and the obtained quantum state information is transmitted to the receiving terminal through the quantum channel. Since the transmitting terminal performs the error-correction anti-loss encoding on the to-be-transmitted message, the message received by the receiving terminal has the error-correction anti-loss capabilities. The transmitting terminal can enable the receiving terminal to receive determined information through the one-way quantum transmission, thereby avoiding large loss caused by the two-way transmission of the quantum state, and thus improving the transmission distance of the quantum communication. Further, the transmitting terminal uses the encryption key negotiated with the receiving terminal to encrypt the code word after the error-correction anti-loss encoding, so that information leakage is not leaded to without using the quantum state block transmission, thereby solving the pain point that the quantum state cannot be saved during the quantum state block transmission, and reducing the complexity of the communication system. In addition, the transmitting terminal and the receiving terminal can perform the key negotiation through the quantum channel, so that the transmitting terminal and the receiving terminal can complete the transmissions of the encryption key and the to-be-transmitted message through one quantum channel, thereby ensuring the security of the data transmission.

DETAILED DESCRIPTION

In order to make the purpose, technical solution and advantages of the present disclosure clearer, the present disclosure will be further detailed below. It should be appreciated that the embodiments described herein are merely utilized to explain the present disclosure, but not intended to limit the scope of the present disclosure.

Figure 1:
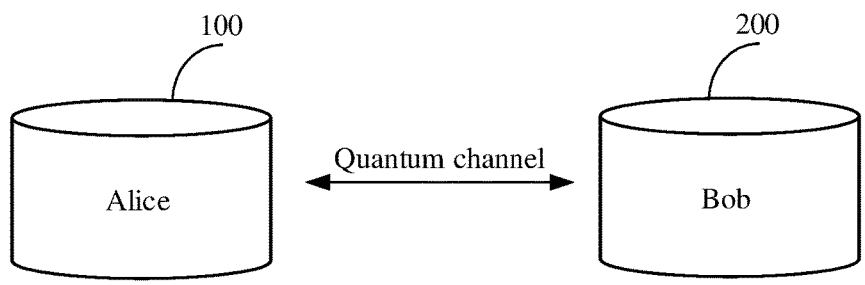
FIG. 1 is an application environment diagram for a quantum secure direct communication method based on a one-way transmission according to an embodiment.

A quantum secure direct communication method based on a one-way transmission provided in the embodiment of the present disclosure can be applied in the application environment as shown in FIG. 1. The above-mentioned application environment may include a user terminal Alice 100 and a user terminal Bob 200, which can be configured to generate, transmit and receive quantum state information. The user terminal Alice 100 and user terminal Bob 200 can serve as a transmitting terminal or a receiving terminal. The above-mentioned user terminal Alice 100 and user terminal Bob 200 can perform the quantum secure direct communication. The quantum state information transmitted by the user terminal Alice 100 can be directly received by the user terminal Bob 200, or received by the user terminal Bob 200 through a relay terminal, which is not limited here.

Figure 2:
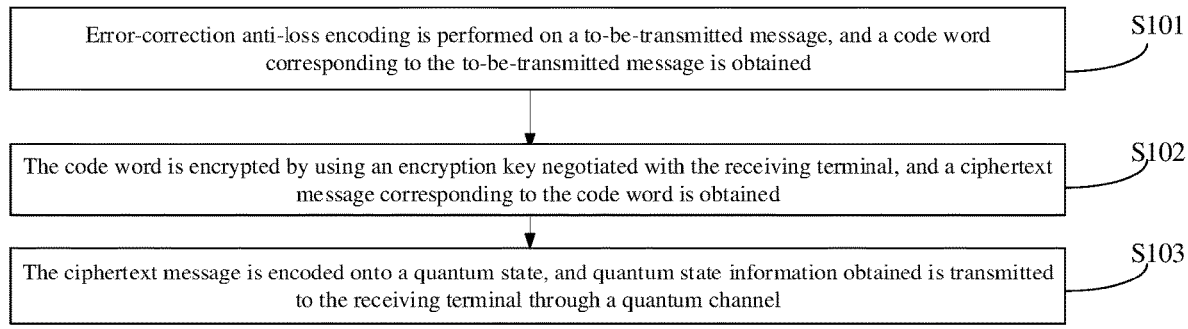
FIG. 2 is a flow chart showing a quantum secure direct communication method based on a one-way transmission according to an embodiment.

In an embodiment, as shown in FIG. 2, a quantum secure direct communication method based on a one-way transmission is provided. The method is applied to the transmitting terminal shown in FIG. 1 as an example for illustration, the method includes following steps.

S101: error-correction anti-loss encoding is performed on a to-be-transmitted message, and a code word corresponding to the to-be-transmitted message is obtained.

The to-be-transmitted message can be a plaintext message to be transmitted by the transmitting terminal to the receiving terminal, and the to-be-transmitted message can include text data, video data, and a control instruction, etc., which is not limited here.

The transmitting terminal can perform the error-correction anti-loss encoding on the to-be-transmitted message, so that the code word received by the receiving terminal can have an error-correction anti-loss capability. In case of missed code or error code in the transmission process, the message transmitted by the transmitting terminal can be obtained. The error-correction anti-loss capability of the above code word is related to an encoding redundancy. The error-correction anti-loss encoding can be configured to perform redundant backup of the to-be-transmitted messages, or to code by means of a loop mode, a verification mode, etc., which is not limited here. Optionally, the transmitting terminal can use a preset error correction algorithm to perform the error-correction encoding processing on the to-be-transmitted message; and then spread spectrum processing is performed on the to-be-transmitted message after the error-correction encoding processing, and the code word corresponding to the to-be-transmitted message is obtained.

S102: the code word is encrypted by using an encryption key negotiated with the receiving terminal, and a ciphertext message corresponding to the code word is obtained.

Based on the above steps, the transmitting terminal can use the encryption key negotiated with the receiving terminal to encrypt the code word. The above encryption mode can be classical cryptography or post-quantum cryptography, etc., which is not limited herein. Alternatively, the transmitting terminal can extract an encryption key with the same length as the code word from a preset key pool to encrypt the code word one encryption at a time. The above one-time pad encryption processing mode may refer to that different encryption characters are adopted to encrypt different characters in the code word.

The above encryption key can be determined through a key negotiation between the transmitting terminal and the receiving terminal. The transmitting terminal and receiving terminal may complete the key negotiation before sending the to-be-transmitted message. The transmitting terminal and receiving terminal can determine an encryption key corresponding to one or more to-be-transmitted messages through one key negotiation. The process of the key negotiation between the transmitting terminal and the receiving terminal can be completed through a quantum channel, for example, as a negotiation of an encryption key of a next to-be-transmitted message is performed on an idle timing sequence in the transmission process of a previous message.

S103: the ciphertext message is encoded onto a quantum state, and quantum state information obtained is transmitted to the receiving terminal through a quantum channel.

After obtaining the encrypted ciphertext message, the transmitting terminal can encode the ciphertext message onto the quantum state to obtain the quantum state information. A carrier of the quantum state information can be a single photon or other resources of the quantum entangled state, which is not limited here.

Specifically, the transmitting terminal can randomly select a base vector for each character in the ciphertext message and encode the character to convert the character into the quantum state information. The encoding can be based on quantum communication protocols. The quantum communication protocols may include: a BB84 quantum key distribution protocol, a six-state quantum key distribution protocol, a COW quantum key distribution protocol, a measurement-device-independent quantum key distribution protocol, a device-independent quantum key distribution protocol, etc.

The BB84 protocol is taken as an example. The transmitting terminal Alice can divide the code word into several frames. In each frame message, a base vector is randomly selected for each character, which can be Z-base or X-base.

Further, a quantum state corresponding to the character is manufactured according to the selected base vector. The BB84 protocol is taken as an example. The character 0 can be encoded as a horizontal or −45 degrees polarization state, and character 1 in the code word is encoded as a vertical or +45 degrees polarization state, as shown in the table below.

| Codeword frame of Alice | 1 | 0 | | 0 | ... | 0 | 1 | | ... | 0 |
|---|---|---|---|---|---|---|---|---|---|---|
| Base vector used by Alice | Z | Z | | X | ... | X | X | | ... | Z |
| Polarization state manufactured by Alice | ↕ | ↔ | | ↘ | ... | ↘ | ↗ | | ... | ↔ |

Further, after the transmitting terminal obtains the quantum state information corresponding to the ciphertext message, the quantum state information can be transmitted to the receiving terminal through the quantum channel.

In the quantum secure direct communication method based on the one-way transmission, the transmitting terminal performs the error-correction anti-loss encoding on the to-be-transmitted message and obtains the code word corresponding to the to-be-transmitted message. Then, the transmitting terminal uses the encryption key negotiated with the receiving terminal to encrypt the code word and obtains the ciphertext message corresponding to the code word. Further, the ciphertext message is encoded onto the quantum state, and the obtained quantum state information is transmitted to the receiving terminal through the quantum channel. Since the transmitting terminal performs the error-correction anti-loss encoding on the to-be-transmitted message, the message received by the receiving terminal has the error-correction anti-loss capability. The transmitting terminal enables the receiving terminal to receive the determined message through one-way quantum transmission, thereby avoiding the large loss caused by two-way transmission of the quantum state, and then improving the transmission distance of the quantum communication. Further, the transmitting terminal uses the encryption key negotiated with the receiving terminal to encrypt the code word after the error-correction anti-loss encoding, without needing to randomly extract the quantum state to perform the channel eavesdropping detection before encoding the plaintext information, so that the quantum state block transmission is not required, which solves the problem that the quantum state cannot be saved during the transmission of the quantum state block, and accordingly the complexity of the communication system is reduced. In addition, the transmitting terminal and the receiving terminal can perform the key negotiation through the quantum channel, so that the transmitting terminal and the receiving terminal can complete the encryption of the key and the transmission of the to-be-transmitted message through one quantum channel, thereby guaranteeing the security of the data transmission.

In an embodiment, based on the above embodiment, before encoding the ciphertext message onto the quantum state, the transmitting terminal can further perform mask processing on the ciphertext message by using a local random number and obtain the to-be-transmitted code word corresponding to the ciphertext message. The local random number and the ciphertext message have the same length.

The mask processing can adopt the increase capacity using masking (INCUM) technique. The transmitting terminal can randomly generate a string of local random numbers based on the length of the ciphertext message. Each character in the ciphertext message corresponds to a single digit in the local random number. The transmitting terminal can perform XOR processing on the ciphertext message with the local random number to obtain the to-be-transmitted code word.

For example, when Alice needs to transmit a ciphertext message a=101010, she first randomly uses a string of local random numbers b=110100 with the same length as the ciphertext message to perform the XOR processing on the ciphertext message and obtains the masked to-be-transmitted code word d=b⊕a=011110.

Further, the transmitting terminal can encode the to-be-transmitted code word onto the quantum state and transmit the obtained quantum state information to the receiving terminal through the quantum channel. Continue to take the above ciphertext message as an example, Alice can encode the to-be-transmitted code word d onto the quantum state and transmit it to the receiving terminal Bob through the quantum channel.

In the above quantum secure direct communication method based on the one-way transmission, the transmitting terminal performs the mask processing on the ciphertext message, which is equivalent to secondary encoding of the ciphertext message, which avoids the exposure of the ciphertext message, and further improves the transmission security of the quantum channel, so that it impossible for an eavesdropper to obtain useful information from a quantum state lost during the transmission.

Figure 3:
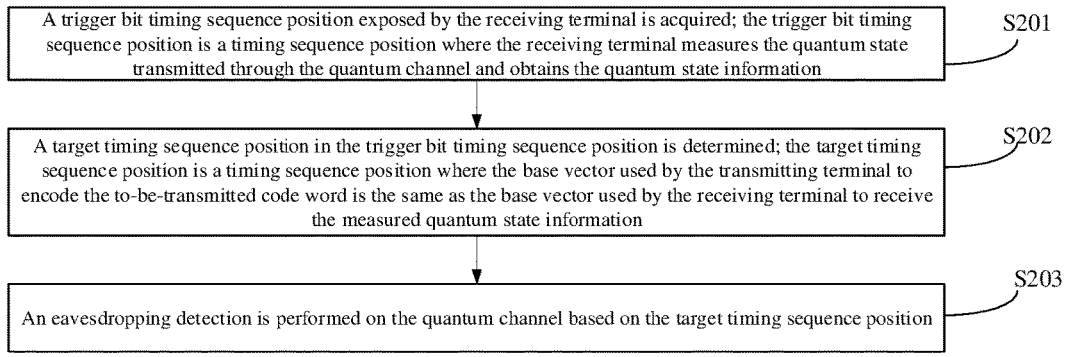
FIG. 3 is a flow chart showing a quantum secure direct communication method based on a one-way transmission according to an embodiment.

FIG. 3 is a flow chart showing a quantum secure direct communication method based on a one-way transmission in another embodiment. The embodiment involves an eavesdropping detection mode performed on a quantum channel by a transmitting terminal. Based on the above embodiment. As shown in FIG. 3, after the step S103, the method further includes the following steps.

S201: a trigger bit timing sequence position exposed by the receiving terminal is acquired. The trigger bit timing sequence position is a timing sequence position where the receiving terminal measures the quantum state transmitted through the quantum channel and obtains the quantum state information.

The receiving terminal can measure the quantum channel and receive the quantum state information. The receiving terminal can measure the quantum state transmitted through the quantum channel according to a preset time window. In each time window, the receiving terminal can randomly select a base vector to receive the quantum state information. When the quantum state information is received, a time sequence corresponding to the time window is marked as a trigger bit. When the quantum state information is not received, the time sequence corresponding to the time window is marked as a non-trigger bit.

The encoding process in the step S103 is taken as an example, and decoding process of the receiving terminal Bob can be provided as follows:

| Codeword frame of Alice | 1 | 0 | 0 | ... | 0 | 1 | ... | 0 |
|---|---|---|---|---|---|---|---|---|
| Base vector used by Alice | Z | Z | X | ... | X | X | ... | Z |
| Polarization state manufactured by Alice | ↕ | ↔ | ↘ | ... | ↘ | ↗ | ... | ↔ |
| Base vector used by Bob | Z | X | X | | Z | X | | Z |
| Measurement result of Bob | ↕ | ↗ | ↘ | | ↔ | ↗ | | ↔ |
| Decoding result | 1 | | 0 | | 1 | | | 0 |

S202: a target timing sequence position in the trigger bit timing sequence position is determined. The target timing sequence position is a timing sequence position where the base vector used by the transmitting terminal to encode the to-be-transmitted code word is the same as the base vector used by the receiving terminal to receive the measured quantum state information.

For the same bit, if the transmitting terminal and the receiving terminal use the same base vector, the receiving terminal can obtain a correct decoding result. If the transmitting terminal and the receiving terminal use different base vectors, a decoding result obtained by the receiving terminal after decoding is inconsistent with information transmitted by the transmitting terminal.

The timing sequence position where the transmitting terminal and the receiving terminal use the same base vector may be the target timing sequence position. The above target timing sequence position can be determined by the transmitting terminal or by the receiving terminal, which is not limited here.

In an implementation mode, the transmitting terminal can expose the base vector used when decoding the to-be-transmitted code word in the trigger bit timing sequence position; and the receiving terminal can perform a bit-by-bit comparison between the base vector exposed by the transmitting terminal and the base vector used by the receiving terminal when receiving the quantum state information, and determine the timing sequence position where the transmitting terminal and the receiving terminal use the same base vector as the target timing sequence position. Optionally, the transmitting terminal can acquire a first base vector exposed and used by the receiving terminal when the receiving terminal receives the quantum state information corresponding to the trigger bit timing sequence position; and compare a second base vector used when encoding the to-be-transmitted code word corresponding to the trigger bit timing sequence position to the first base vector; and determine a timing sequence position with the same base vector as the target timing sequence position.

S203: an eavesdropping detection is performed on the quantum channel based on the target timing sequence position.

Based on the above step, the transmitting terminal can determine that the to-be-transmitted code word corresponding to the target timing sequence position can be received by the receiving terminal. The transmitting terminal can determine whether the quantum channel is eavesdropped according to the receiving result of the to-be-transmitted code word corresponding to the target timing sequence position. If the quantum channel is eavesdropped, the eavesdropping action may affect the state of the quantum state information, and a bit error rate of the information received by the receiving terminal is higher. The transmitting terminal can determine whether the quantum channel is eavesdropped according to the statistical bit error rate in the target timing sequence position.

In the above quantum secure direct communication method based on the one-way transmission, the transmitting terminal can complete the information transmission under the condition of secure quantum channel through the eavesdropping detection of the quantum channel, thereby guaranteeing the security of data transmission.

Figure 4:
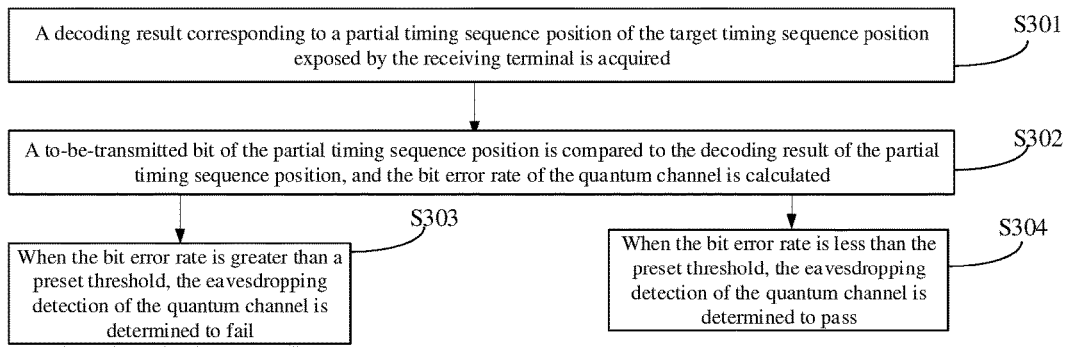
FIG. 4 is a flow chart showing a quantum secure direct communication method based on a one-way transmission according to an embodiment.

FIG. 4 is a flow chart showing a quantum secure direct communication method based on a one-way transmission in an embodiment. The embodiment involves an implementation mode of performing an eavesdropping detection on a quantum channel by the transmitting terminal. Based on the above-mentioned embodiment, as shown in FIG. 4, the step S203 includes the following steps.

S301: a decoding result corresponding to a partial timing sequence position of the target timing sequence position exposed by the receiving terminal is acquired.

After acquiring the decoding result of the target timing sequence position, the receiving terminal can randomly extract a decoding result corresponding to the partial timing sequence position in the decoding result to calculate the bit error rate of the quantum channel. The receiving terminal can transmit the partial result to the transmitting terminal through a classical transmission channel.

S302: a to-be-transmitted bit of the partial timing sequence position is compared to the decoding result of the partial timing sequence position, and the bit error rate of the quantum channel is calculated.

The transmitting terminal can compare the partial decoding result to the corresponding to-be-transmitted code word to determine whether the receiving terminal is decoding correctly. The transmitting terminal can calculate a ratio of the number of correctly decoded bits to the number of bits of the received decoding result, to obtain the bit error rate of the quantum channel.

S303: when the bit error rate is greater than a preset threshold, the eavesdropping detection of the quantum channel is determined to fail.

If the bit error rate obtained by the transmitting terminal is greater than the preset threshold, the transmitting terminal can determine that the quantum channel is eavesdropped and determine that the eavesdropping detection fails.

S304: when the bit error rate is less than the preset threshold, the eavesdropping detection of the quantum channel is determined to pass.

If the bit error rate obtained by the transmitting terminal is less than the preset threshold, the transmitting terminal can determine that the quantum channel may not be eavesdropped and determine that the eavesdropping detection passes.

It should be noted that the above eavesdropping detection can be performed by the transmitting terminal, or the receiving terminal, or by the transmitting terminal and the receiving terminal together, which is not limited here.

For example, the transmitting terminal can expose the to-be-transmitted code word corresponding to the partial timing sequence position of the target timing sequence position to the receiving terminal through the classical communication channel, so that the receiving terminal can calculate the ratio of the number of correctly decoded bits to the number of bits of the received decoding result in the decoding result of the partial timing sequence position, and obtain the bit error rate of the quantum channel.

If the eavesdropping detection result is determined to pass, the transmitting terminal can continue to transmit messages to the receiving terminal. In the case that the eavesdropping detection result fails, the transmitting terminal can abandon the currently to-be-transmitted message and select another quantum channel for retransmission, or re-transmit the message through the current quantum channel.

Based on that the eavesdropping detection result is determined to pass, the transmitting terminal can expose a sub-random number corresponding to the trigger bit timing sequence position in the local random number to the receiving terminal. The above sub-random number is configured to perform, by the receiving terminal, unmasking processing on a decoding result corresponding to the trigger bit timing sequence position.

For example, if Alice needs to transmit a ciphertext message a=101010, she first randomly uses a string of local random numbers b=110100 with the same length as the ciphertext message to perform the XOR processing on the ciphertext message and obtains the masked to-be-transmitted code word d=b⊕a=011110. If Bob receives the first five positions in the timing sequence position; the transmitting terminal can form a sub-random number by using numerical values corresponding to first to fifth digits in the local random number, and transmit the sub-random number to Bob. Bob receives the sub-random number 11010, and then perform the unmasking processing on the decoding result corresponding to the trigger bit timing sequence position by using the sub-random number.

When performing the mask processing on the ciphertext information, the transmitting terminal can perform the XOR processing on the ciphertext information and the local random number. Accordingly, the receiving terminal can perform reverse processing of the XOR processing on the sub-random number and the decoding result of the trigger bit timing sequence position.

In the above quantum secure direct communication method based on the one-way transmission, the transmitting terminal can obtain the bit error rate of the quantum channel through part of the transmitted data by exposing the to-be-transmitted code word of part of the target timing sequence position, without needing to perform the channel eavesdropping detection through the block transmission before the data transmission, without needing a quantum memory, thereby improving the practicability of the quantum communication.

In an embodiment, based on the above embodiment, the transmitting terminal may return encryption characters corresponding to the remaining non-trigger bit timing sequence positions except the trigger bit timing sequence position, to the key pool.

A ciphertext message in the non-trigger bit timing sequence position is masked by a local random number and is not exposed. Only the transmitting terminal can obtain the ciphertext message. Therefore, the encryption characters utilized to encrypt the masked ciphertext message are not exposed. Accordingly, the transmitting terminal returns the encryption characters to the key pool, thereby reducing the consumption of key resources in the key pool.

Figure 5:
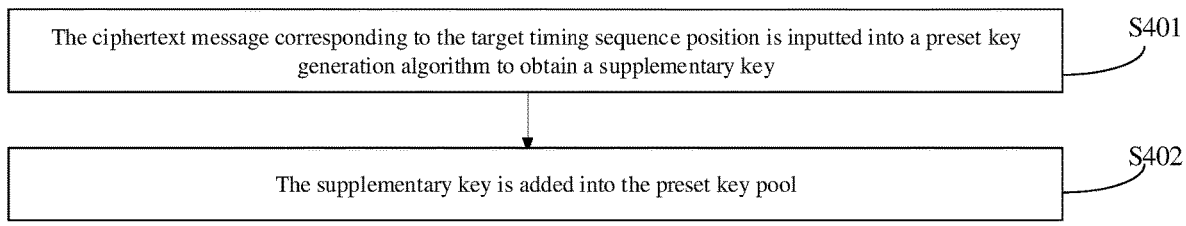
FIG. 5 is a flow chart showing a quantum secure direct communication method based on a one-way transmission according to an embodiment.

FIG. 5 is a flow chart showing a quantum secure direct communication method based on a one-way transmission in an embodiment. The embodiment involves an implementation mode for generating an encryption key by a transmitting terminal. Based on the above embodiment. As shown in FIG. 5, the above-mentioned method further includes the following steps.

S401: the ciphertext message corresponding to the target timing sequence position is inputted into a preset key generation algorithm to obtain a supplementary key.

Since the target timing sequence position is a timing sequence position where the receiving terminal receives the quantum state information and the base vector used when receiving the quantum state information is the same as the base vector used by the transmitting terminal. Accordingly, for the target timing sequence position, the decoding result obtained by the receiving terminal after decoding the quantum state information is highly similar to the ciphertext message transmitted by the transmitting terminal.

The transmitting terminal can input the ciphertext message corresponding to the target timing sequence position into the preset key generation algorithm to obtain the supplementary key. In the above key generation algorithm, error correction and privacy amplification operations, etc., involved in the standard quantum key distribution protocol can be performed to obtain the supplementary key. Accordingly, the receiving terminal can input the decoding result corresponding to the target timing sequence position into the key generation algorithm, generate a corresponding decryption key in the receiving terminal, and add the decryption key into the key pool in the receiving terminal.

S402: the supplementary key is added into the preset key pool.

Further, the transmitting terminal can add the supplementary key into the preset key pool.

Accordingly, the receiving terminal can copy the decoding result corresponding to the target timing sequence position to obtain an initial code; then input the initial code into the key generation algorithm, generate the corresponding supplementary key in the receiving terminal, and add the supplementary key into the key pool in the receiving terminal.

In the above-mentioned quantum secure direct communication method based on the one-way transmission, the transmitting terminal can supplement the key in the key pool in the process of message transmission through the ciphertext message of the target timing sequence position, and provide the key required by the one-time pad encryption mode.

Figure 6:
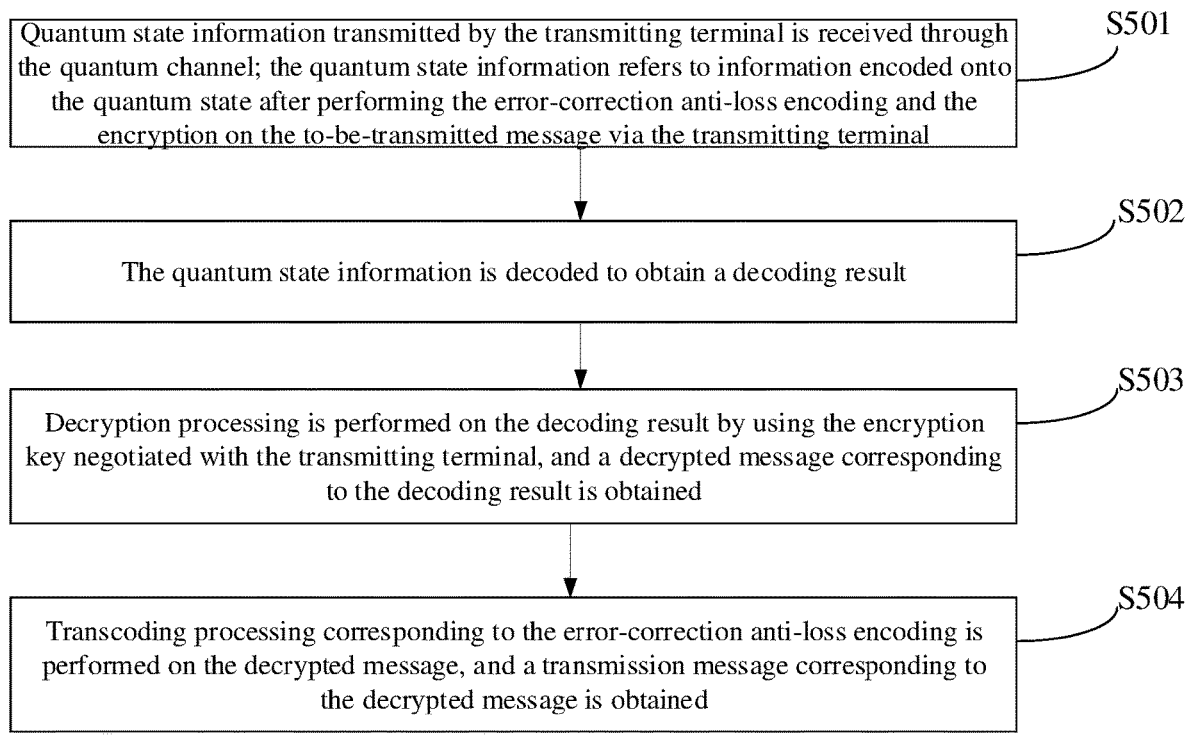
FIG. 6 is a flow chart showing a quantum secure direct communication method based on a one-way transmission according to an embodiment.

In an embodiment, as shown in FIG. 6, a quantum secure direct communication method based on a one-way transmission is provided. The method is applied to the receiving terminal in FIG. 1 as an example for illustration, and includes following steps.

S501: quantum state information transmitted by the transmitting terminal is received through the quantum channel. The quantum state information refers to information encoded onto the quantum state after performing the error-correction anti-loss encoding and the encryption on the to-be-transmitted message by the transmitting terminal.

The receiving terminal can measure the quantum state transmitted through the quantum channel according to the preset time window and obtain the quantum state information. The receiving terminal can randomly select a base vector from the Z-base and X-base to receive the quantum state information. If quantum state information is received, it is marked as a trigger bit. If no quantum state information is received, it is marked as a non-trigger bit.

As for the specific limitation of the quantum state information, reference can be made to the description of S101, which is not limited here.

S502: the quantum state information is decoded to obtain a decoding result.

The receiving terminal can decode the received quantum state information according to a preset corresponding relationship and obtain the decoding result. The decoding process can be as shown in the table in S201, which is not repeated here.

S503: decryption processing is performed on the decoding result by using the encryption key negotiated with the transmitting terminal, and a decrypted message corresponding to the decoding result is obtained.

The receiving terminal can use the key negotiated with the transmitting terminal to perform the decryption processing on the decoding result and obtain the decrypted message.

The decoded result obtained by the receiving terminal may not be completely consistent with the ciphertext message transmitted by the transmitting terminal, and there may exist bit flip and loss. However, since the transmitting terminal performs the error-correction anti-loss encoding on the to-be-transmitted message, the receiving terminal can tolerate a certain degree of bit loss and error.

S504: transcoding processing corresponding to the error-correction anti-loss encoding is performed on the decrypted message, and a transmission message corresponding to the decrypted message is obtained.

The receiving terminal can perform the transcoding processing on the decrypted information to obtain the transmission message, and complete the determined information transmission.

As for the technical effect and implementation principle of the above quantum secure direct communication method based on the one-way transmission, reference can be made to the method embodiments of the transmitting terminal side, which will not be repeated here.

In an embodiment, the above quantum state information is obtained by performing the mask processing on the to-be-transmitted message with the local random number by the transmitting terminal, and the receiving terminal can further acquire the sub-random number corresponding to the trigger bit timing sequence position returned by the transmitting terminal. The trigger bit timing sequence position is the timing sequence position where the quantum state information is detected, and the transmitting terminal encodes the to-be-transmitted code word onto the quantum state and transmit the code word, and the receiving terminal measures the received quantum state information and obtains the detection result. The above sub-random number is the partial numerical value corresponding to the trigger bit timing sequence position determined by the transmitting terminal in the local random number. Further, the receiving terminal can use the sub-random number to perform the unmasking processing on the decoding result corresponding to the trigger bit timing sequence position. As for the unmasking processing, reference can be made to the description in S304, which is not limited herein.

In an embodiment, the receiving terminal can copy the decoding result corresponding to the target timing sequence position to obtain the initial code, and then input the initial code into the preset key generation algorithm to obtain the supplementary key, and add the supplementary key into the preset key pool. The target timing sequence position is the timing sequence position where the base vector used by the transmitting terminal to encode the to-be-transmitted code word onto the quantum state is the same as the base vector used by the receiving terminal to decode the received quantum state information.

As for the technical effect and implementation principle of the above quantum secure direct communication method based on the one-way transmission, reference can be made to the method embodiments of the transmitting terminal side, which will not be repeated here.

Figure 7:
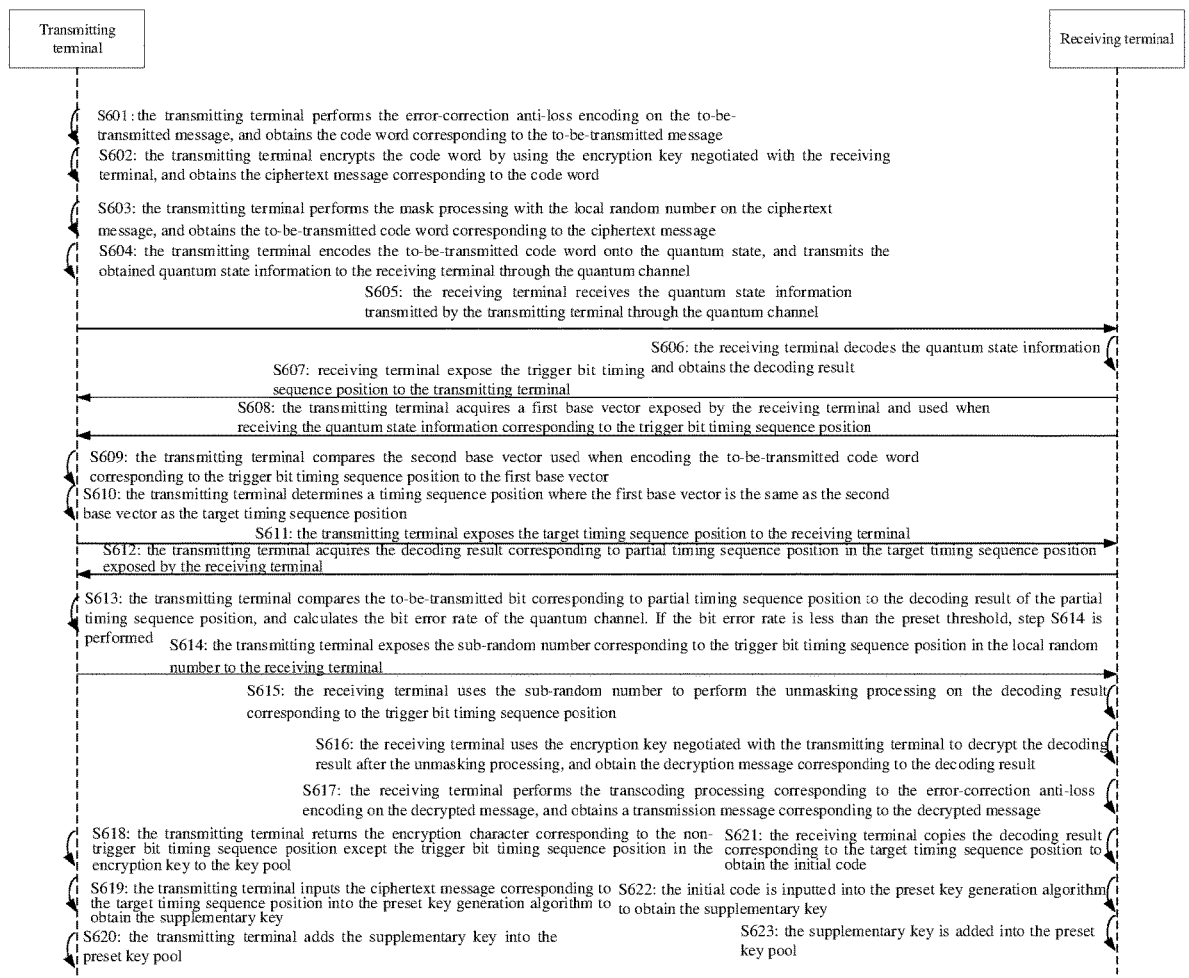
FIG. 7 is a flow chart showing a quantum secure direct communication method based on a one-way transmission according to an embodiment.

In an embodiment, a quantum secure direct communication method based on a one-way transmission is provided, as shown in FIG. 7.

S601: the transmitting terminal performs the error-correction anti-loss encoding on the to-be-transmitted message, and obtains the code word corresponding to the to-be-transmitted message.

Figure 8:
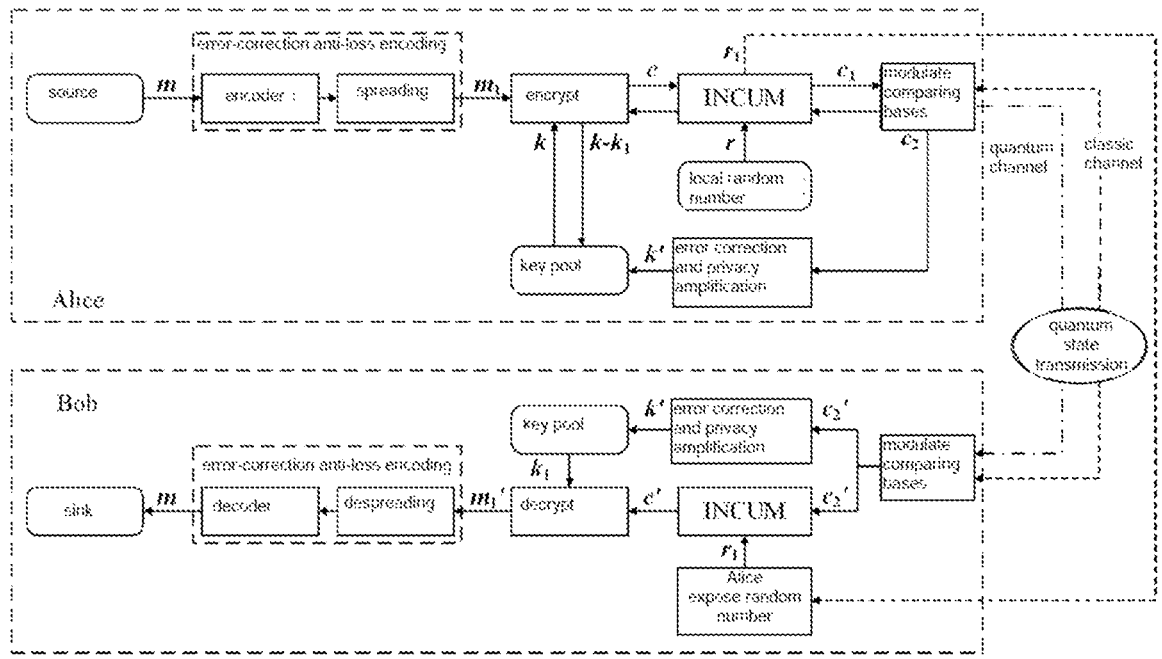
FIG. 8 is a schematic diagram showing a quantum secure direct communication method based on a one-way transmission according to an embodiment.

As shown in FIG. 8, Alice performs the error-correction anti-loss encoding on the to-be-transmitted message m in her message source and obtains the code word m1.

S602: the transmitting terminal encrypts the code word by using the encryption key negotiated with the receiving terminal, and obtains the ciphertext message corresponding to the code word.

Alice extracts a completely random key k with the same length as m1 from the key pool, and performs the one-time pad encryption on m1 to obtain the ciphertext message c, where $c=k\oplus m1$.

S603: the transmitting terminal performs the mask processing with the local random number on the ciphertext message, and obtains the to-be-transmitted code word corresponding to the ciphertext message.

Alice uses INCUM technology to perform the mask processing on the ciphertext message c, and performs the XOR processing on the ciphertext message c with the local random number r having the same length as c, and obtains the to-be-transmitted code word c1, where $c1=r\oplus c$.

S604: the transmitting terminal encodes the to-be-transmitted code word onto the quantum state, and transmits the obtained quantum state information to the receiving terminal through the quantum channel.

Alice divides the to-be-transmitted code word c1 into several frames, and randomly selects Z-base or X-base according to information of one frame to manufacture the quantum state, and transmits the quantum state information frame by frame.

S605: the receiving terminal receives the quantum state information transmitted by the transmitting terminal through the quantum channel.

Bob randomly selects Z-base or X-base to measure the quantum channel, and marks a timing sequence position where the quantum state information is measured as a trigger bit, and marks a timing sequence position where no measurement result is obtained as a non-trigger bit.

S606: the receiving terminal decodes the quantum state information and obtains the decoding result.

S607: the receiving terminal exposes the trigger bit timing sequence position to the transmitting terminal.

S608: the transmitting terminal acquires a first base vector exposed by the receiving terminal and used when receiving the quantum state information corresponding to the trigger bit timing sequence position.

Bob exposes the base vector corresponding to the trigger bit timing sequence position to Alice through a classical authentication channel.

S609: the transmitting terminal compares the second base vector used when encoding the to-be-transmitted code word corresponding to the trigger bit timing sequence position to the first base vector.

S610: the transmitting terminal determines a timing sequence position where the first base vector is the same as the second base vector as the target timing sequence position.

S611: the transmitting terminal exposes the target timing sequence position to the receiving terminal.

Bob obtains the decoding result corresponding to the target timing sequence position, and marks it as $c_2$.

S612: the transmitting terminal acquires the decoding result corresponding to partial timing sequence position in the target timing sequence position exposed by the receiving terminal.

S613: the transmitting terminal compares the to-be-transmitted bit corresponding to partial timing sequence position to the decoding result of the partial timing sequence position, and calculates the bit error rate of the quantum channel. If the bit error rate is less than the preset threshold, step S614 is performed.

S614: the transmitting terminal exposes the sub-random number corresponding to the trigger bit timing sequence position in the local random number to the receiving terminal.

Alice extracts a sub-random number r1 from the local random number r and exposes r1 to the receiving terminal.

S615: the receiving terminal uses the sub-random number to perform the unmasking processing on the decoding result corresponding to the trigger bit timing sequence position.

Bob uses the sub-random number r1 to perform the unmasking processing on the decoding result corresponding to the trigger bit timing sequence position, and c' is obtained by performing the unmasking processing on the decoding result corresponding to the target timing sequence position.

S616: the receiving terminal uses the encryption key negotiated with the transmitting terminal to decrypt the decoding result after the unmasking processing, and obtains the decryption message corresponding to the decoding result.

Bob decrypts c' according to the key k1 corresponding to the target timing sequence position, and obtains the decrypted message $m_1'$.

S617: the receiving terminal performs the transcoding processing corresponding to the error-correction anti-loss encoding on the decrypted message, and obtains a transmission message corresponding to the decrypted message.

Bob transcodes $m_1'$ and obtains the transmission message.

The above method further includes the following steps.

S618: the transmitting terminal returns the encryption character corresponding to the non-trigger bit timing sequence position except the trigger bit timing sequence position in the encryption key to the key pool.

Alice returns the encryption character k-k1 corresponding to the non-trigger bit timing sequence position except the trigger bit timing sequence position in the encryption key k to the key pool.

S619: the transmitting terminal inputs the ciphertext message corresponding to the target timing sequence position into the preset key generation algorithm to obtain the supplementary key.

The transmitting terminal performs the error correction and privacy amplification processing on the ciphertext message $c_2$ corresponding to the target timing sequence position, and generates the supplementary key.

S620: the transmitting terminal adds the supplementary key into the preset key pool.

Alice adds k' into the key pool.

S621: the receiving terminal copies the decoding result corresponding to the target timing sequence position to obtain the initial code.

Bob copies the decoding result corresponding to the target timing sequence position and obtains $c_2'$.

S622: the initial code is inputted into the preset key generation algorithm to obtain the supplementary key.

Bob performs the error correction and privacy amplification processing on $c_2'$ and obtains the supplementary key.

S623: the supplementary key is added into the preset key pool.

Bob adds k' into the key pool.

As for the technical effect and implementation principle of the above quantum secure direct communication method based on the one-way transmission, reference can be made to the method embodiments of the transmitting terminal side, which will not be repeated here.

It should be appreciated that although the steps in the flow charts involved in the embodiments above are shown in sequence as indicated by the arrows, these steps are not definitely performed follow the sequence indicated by the arrows. Unless explicitly stated in this article, there is no strict order in which these steps can be performed, and these steps can be performed in other orders. In addition, at least part of the steps in the flow charts involved in the above embodiments may include multiple steps or stages, which are not definitely performed at the same time, but can be performed at different moments, and the execution sequence of these steps or stages is not definitely sequential, but can be performed in turns or alternatively with other steps or at least part of steps or stages within other steps.

Figure 9:
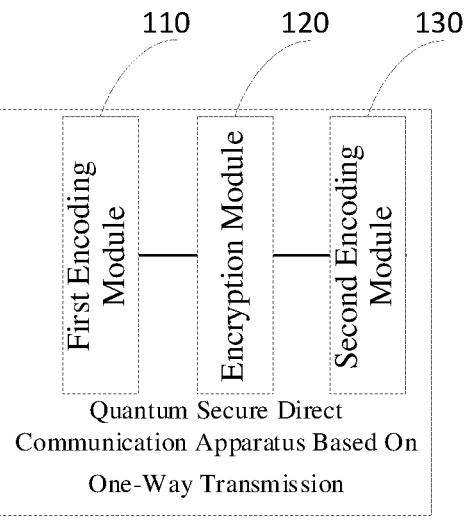
FIG. 9 is a structure diagram illustrating a quantum secure direct communication apparatus based on a one-way transmission according to an embodiment.

Based on the same inventive concept, in the present embodiment of the present disclosure, a quantum secure direct communication apparatus based on a one-way transmission is provided to implement the above-mentioned quantum secure direct communication method based on the one-way transmission. The solution for addressing the technical problem provided by the apparatus is similar to that provided by the above method. Therefore, as for the specific limitations in one or more embodiments of the quantum secure direct communication apparatus based on the one-way transmission provided below, reference can be made to the above limitations for the quantum secure direct communication method based on the one-way transmission described above, which will not be repeated here. In an embodiment, as shown in FIG. 9, a quantum secure direct communication apparatus based on a one-way transmission is provided, which is applied to the transmitting terminal in the quantum communication system, and includes:

a first encoding module 110, configured to perform error-correction anti-loss encoding on a to-be-transmitted message and obtain a code word corresponding to the to-be-transmitted message;

an encryption module 120, configured to encrypt the code word with an encryption key negotiated with a receiving terminal and obtain a ciphertext message corresponding to the code word; and a second encoding module 130, configured to encode the ciphertext message onto a quantum state and transmit quantum state information obtained to the receiving terminal through a quantum channel.

Figure 10:
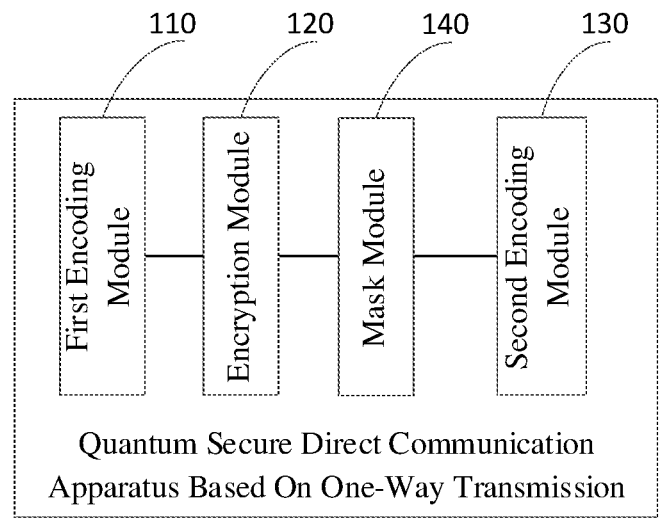
FIG. 10 is a structure diagram illustrating a quantum secure direct communication apparatus based on a one-way transmission according to an embodiment.

In an embodiment, as shown in FIG. 10, the above apparatus further includes a mask module 140, which is configured to: perform mask processing on the ciphertext message with a local random number, and obtain the to-be-transmitted code word corresponding to the ciphertext message. The local random number has the same length as the ciphertext message.

Accordingly, the second encoding module 130 is configured to encode the to-be-transmitted code word onto the quantum state, and transmit the quantum state information obtained to the receiving terminal through the quantum channel.

Figure 11:
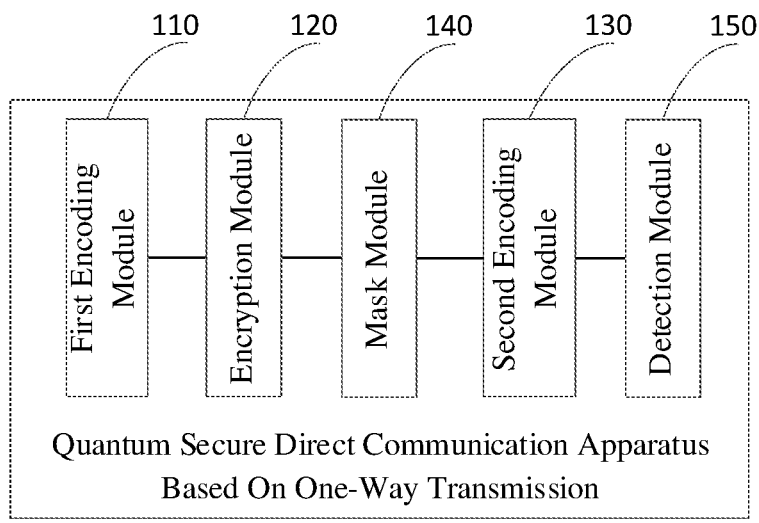
FIG. 11 is a structure diagram illustrating a quantum secure direct communication apparatus based on a one-way transmission according to an embodiment.

In an embodiment, as shown in FIG. 11, the apparatus further includes a detection module 150, which is configured to: obtain a trigger bit timing sequence position exposed by the receiving terminal, in which the trigger bit timing sequence position refers to a timing sequence position where the receiving terminal measures the quantum state transmitted through the quantum channel to obtain the quantum state information; determine a target timing sequence position in the trigger bit timing sequence position, in which the target timing sequence position is a timing sequence position where a base vector used by the transmitting terminal to encode the to-be-transmitted code word is the same as a base vector used by the receiving terminal to receive the measured quantum state information; and perform a eavesdropping detection on the quantum channel based on the target timing sequence position.

In an embodiment, the apparatus further includes a detection module 150 which is specifically configured to: acquire a decoding result corresponding to a partial timing sequence position of the target timing sequence position exposed by the receiving terminal; compare a to-be-transmitted bit of the partial timing sequence position to the decoding result of the partial timing sequence position, and calculate a bit error rate of the quantum channel; determine, if the bit error rate is greater than a preset threshold, the eavesdropping detection of the quantum channel to fail; and determine, if the bit error rate is less than the preset threshold, the eavesdropping detection of the quantum channel to pass.

In an embodiment, the apparatus further includes the detection module 150, which is specifically configured to: acquire a first base vector exposed by the receiving terminal and used when receiving the quantum state information corresponding to the trigger bit timing sequence position; compare a second base vector used when encoding the to-be-transmitted code word corresponding to the trigger bit timing sequence position to the first base vector; and determine a timing sequence position where the first base vector is the same as the second base vector as a target timing sequence position.

Figure 12:
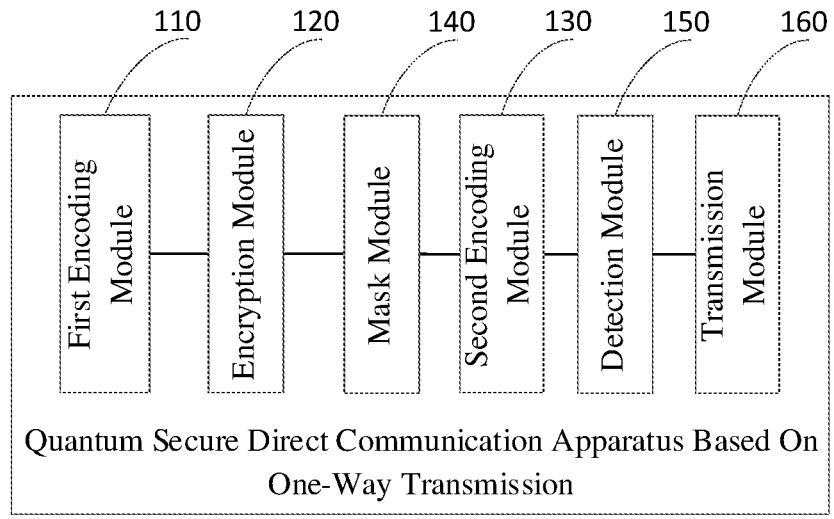
FIG. 12 is a structure diagram illustrating a quantum secure direct communication apparatus based on a one-way transmission according to an embodiment.

In an embodiment, as shown in FIG. 12, the apparatus further includes a transmission module 160, which is configured to: expose a sub-random number corresponding to the trigger bit timing sequence position in the local random number to the receiving terminal. The sub-random number is configured to perform, by the receiving terminal, mask processing on the decoding result corresponding to the trigger bit timing sequence position.

In an embodiment, the encryption module 120 is specifically configured to extract an encryption key with the same length as the code word from a preset key pool, and perform one-time pad encryption processing on the code word.

Figure 13:
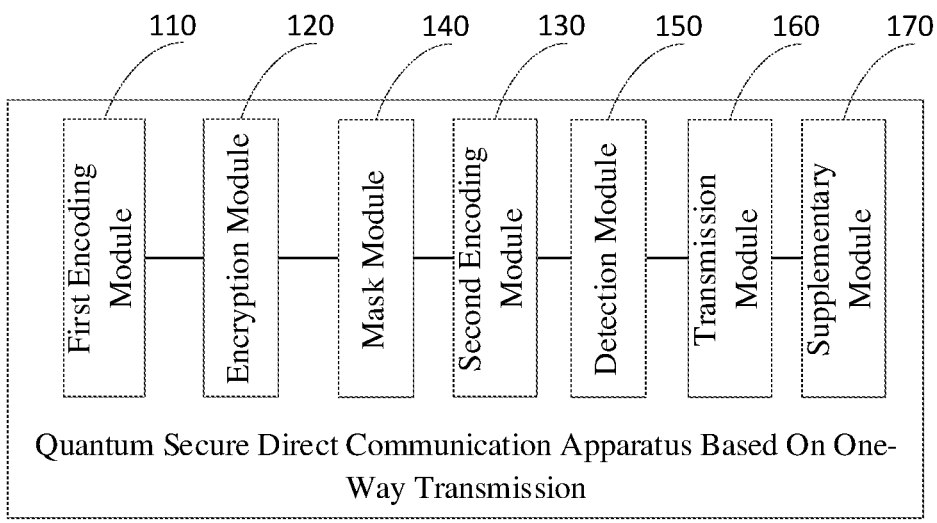
FIG. 13 is a structure diagram illustrating a quantum secure direct communication apparatus based on a one-way transmission according to an embodiment.

In an embodiment, as shown in FIG. 13, the apparatus further includes a supplementary module 170, which is configured to return an encryption character corresponding to a non-trigger bit timing sequence position except the trigger bit timing sequence position in the encryption key and configured to encrypt the code word after the error-correction anti-loss encoding, to the key pool.

Figure 14:
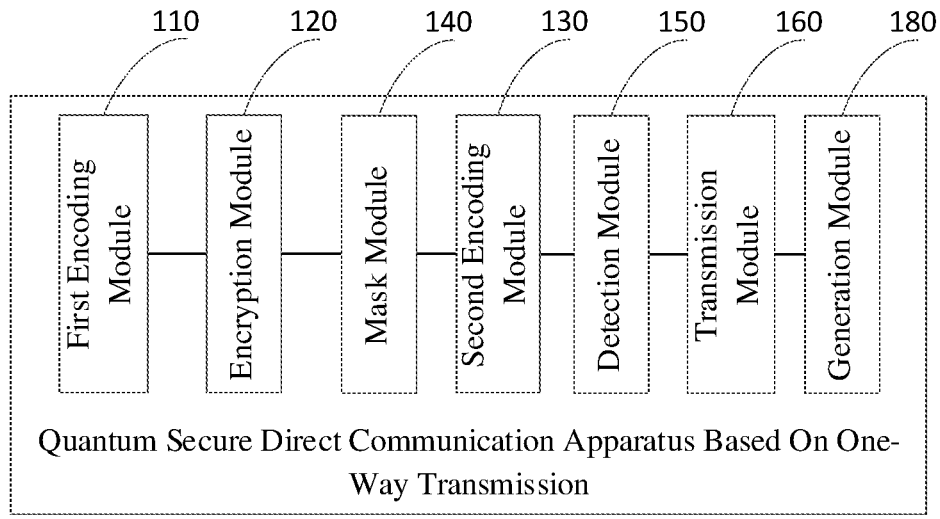
FIG. 14 is a structure diagram illustrating a quantum secure direct communication apparatus based on a one-way transmission according to an embodiment.

In an embodiment, as shown in FIG. 14, the apparatus further includes a generation module 180, which is configured to: input the ciphertext message corresponding to the target timing sequence position into a preset key generation algorithm to obtain a supplementary key, and add the supplementary key into the preset key pool.

In an embodiment, the first encoding module 110 is specifically configured to perform error-correction encoding processing on the to-be-transmitted messages by using a preset error-correction algorithm, perform spread spectrum processing on the to-be-transmitted message after the error-correction encoding processing, and obtain the code word corresponding to the to-be-transmitted message.

Figure 15:
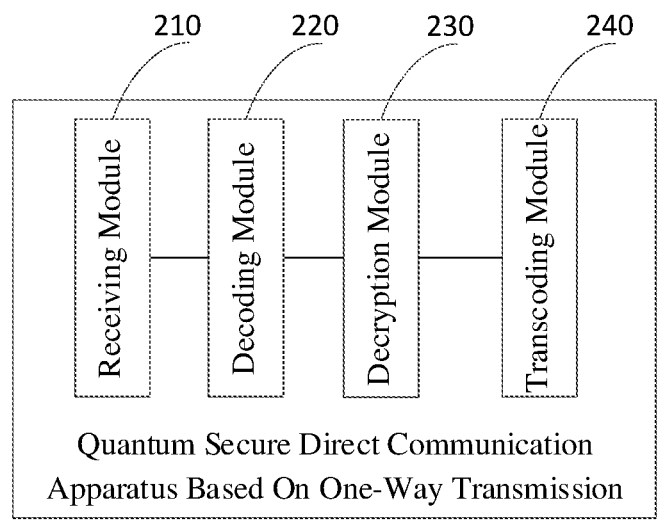
FIG. 15 is a structure diagram illustrating a quantum secure direct communication apparatus based on a one-way transmission according to an embodiment.

In an embodiment, as shown in FIG. 15, a quantum secure direct communication apparatus based on a one-way transmission is provided, which is applied to a receiving terminal in a quantum communication system and includes:

a receiving module 210, configured to receive quantum state information transmitted by a transmitting terminal through a quantum channel, in which the quantum state information refers to information encoded onto the quantum state after performing the error-correction anti-loss encoding and an encryption on the to-be-transmitted message by the transmitting terminal;

a decoding module 220, configured to decode the quantum state information to obtain a decoding result;

a decryption module 230, configured to perform decryption processing on the decoding result by using an encryption key negotiated with the transmitting terminal, and obtain a decrypted message corresponding to the decoding result; and a transcoding module 240, configured to perform transcoding processing corresponding to the error-correction anti-loss encoding on the decrypted message, and obtain a transmission message corresponding to the decrypted message.

In an embodiment, the above receiving module 210 is specifically configured to measure the quantum state transmitted through the quantum channel according to the preset time window, and obtain the quantum state information.

Figure 16:
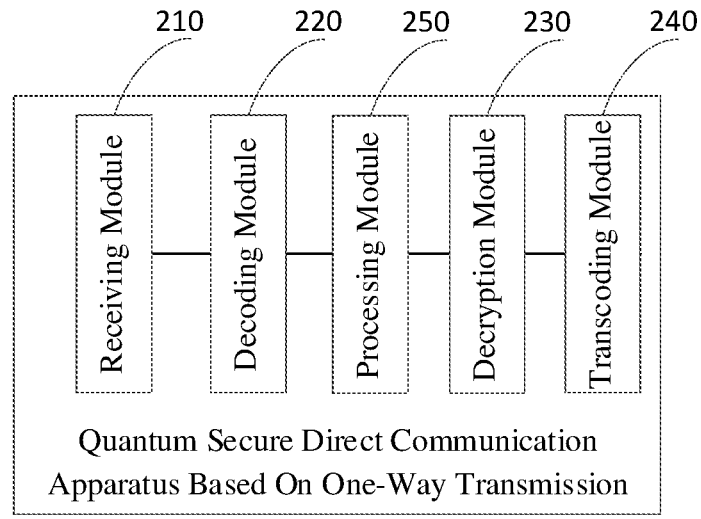
FIG. 16 is a structure diagram illustrating a quantum secure direct communication apparatus based on a one-way transmission according to an embodiment.

In an embodiment, the quantum state information is encoded onto the quantum state after the transmitting terminal performs the mask processing on the to-be-transmitted message with the local random number. As shown in FIG. 16, the above apparatus further includes a processing module 250, which is configured to: acquire the sub-random number corresponding to the trigger bit timing sequence position returned by the transmitting terminal, in which the trigger bit timing sequence position refers to a timing sequence position where the quantum state information is detected, and the sub-random number refers to a partial numerical value corresponding to the trigger bit timing sequence position in the local random number determined by the transmitting terminal; and use the sub-random number to perform the unmasking processing on the decoding result corresponding to the trigger bit timing sequence position.

Figure 17:
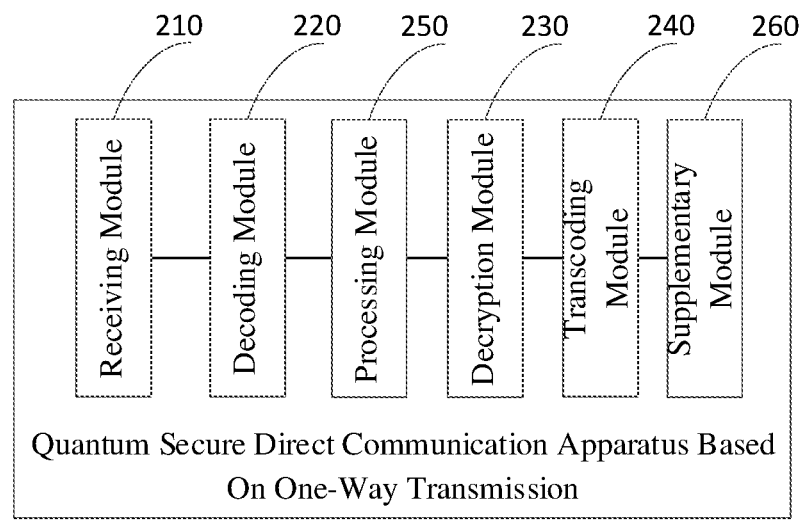
FIG. 17 is a structure diagram illustrating a quantum secure direct communication apparatus based on a one-way transmission according to an embodiment.

In an embodiment, as shown in FIG. 17, the apparatus further includes a supplementary module 260 configured to: copy the decoding result corresponding to the target timing sequence position to obtain an initial code, input the initial code into the preset key generation algorithm to obtain a supplementary key, and add the supplementary key into the preset key pool. The target timing sequence position refers to the timing sequence position where a base vector used by the transmitting terminal to encode the to-be-transmitted code word is the same as a base vector used by the receiving terminal to receive the measured quantum state information.

As for the specific implementation effect and technical principle of the above apparatus embodiments, reference can be made to the method embodiments, which will not be repeated here.

Each module in the above quantum secure direct communication apparatus based on the one-way transmission can be fully or partially implemented by software, hardware and the combination thereof. The above modules can be embedded in or independent of the processor in the computer device in the form of hardware, or can be stored in the memory of the computer device in the form of software, to facilitate the processor to call and execute the corresponding operations of the above modules.

Figure 18:
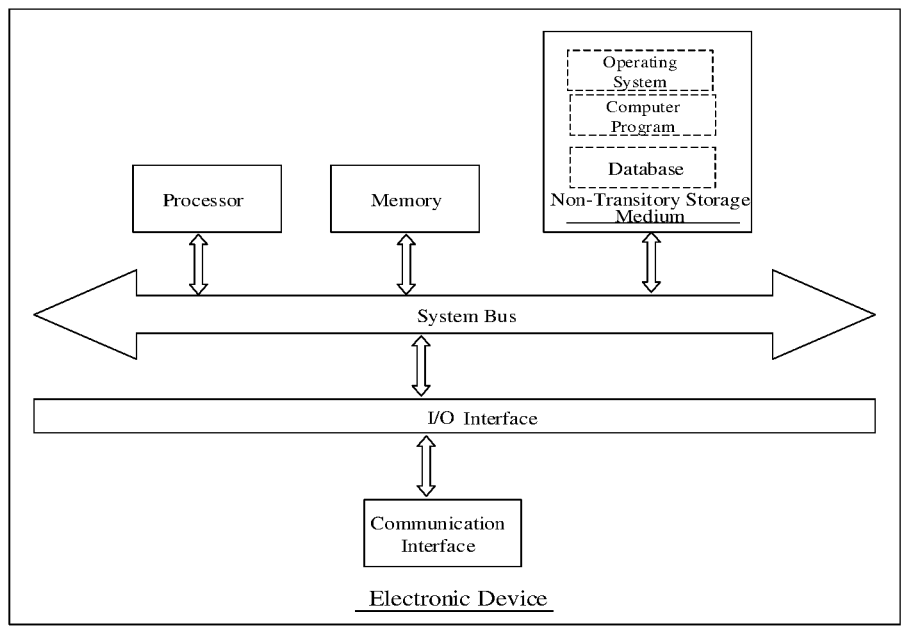
FIG. 18 is an internal structure diagram of an electronic device according to an embodiment.

In an embodiment, an electronic device is provided, and an internal structure diagram thereof can be shown as FIG. 18. The electronic device includes a processor, a memory, and a network interface, which are connected through a system bus. The processor of the electronic device is configured to provide computing and control capabilities. The memory of the electronic device includes a non-transitory storage medium and an internal memory. The non-transitory storage medium stores an operating system, a computer program, and a database. The internal memory provides an environment for the operations of the operating system and computer programs in the non-transitory storage medium. The database of the electronic device is configured to store quantum secure direct communication data based on a one-way transmission. The network interface of the electronic device is configured to communicate with an external terminal through a network connection. The computer program is executed by the processor to implement a quantum secure direct communication method based on a one-way transmission.

In an embodiment, an electronic device is further provided, which includes a processor and a memory for storing a computer program, and the processor executes the computer program to implement the steps in the method embodiments on the transmitting terminal side described above.

In an embodiment, an electronic device is further provided, which includes a processor and a memory for storing a computer program, and the processor executes the computer program to implement the steps in the method embodiments on the receiving terminal side described above.

It should be appreciated by the technical personnel in the field that the structure shown in FIG. 18 is merely a block diagram of a part of the structure related to the solution of the present disclosure, and does not constitute a limitation to the computer device on which the solution is applied. The specific computer device may include more or less components than that shown in the figure, or combine some components, or have different component arrangements.

Figure 19:
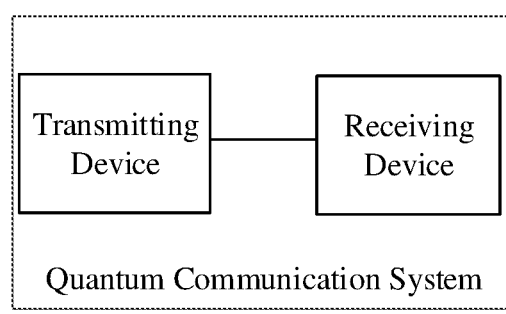
FIG. 19 is a schematic structure diagram of a quantum communication system according to an embodiment.

In an embodiment, as shown in FIG. 19, a quantum communication system is provided, which includes a transmitting device and a receiving device. The transmitting device can be configured to: perform error-correction anti-loss encoding on a to-be-transmitted message and obtain a code word corresponding to the to-be-transmitted message; encrypt the code word with an encryption key negotiated with a receiving device and obtain a ciphertext message corresponding to the code word; and encode the ciphertext message onto a quantum state and transmit quantum state information obtained to the receiving device through a quantum channel.

The receiving device can be configured to: receive quantum state information transmitted by a transmitting device through a quantum channel, in which the quantum state information refers to information encoded onto the quantum state after performing the error-correction anti-loss encoding and an encryption on the to-be-transmitted message via the transmitting device; decode the quantum state information to obtain a decoding result; perform decryption processing on the decoding result by using an encryption key negotiated with the transmitting device, and obtain a decrypted message corresponding to the decoding result; and perform transcoding processing corresponding to the error-correction anti-loss encoding on the decrypted message, and obtain a transmission message corresponding to the decrypted message.

The implementation principle and technical effect of the above quantum communication system correspond to the above method embodiments, which will not be repeated here.

In an embodiment, a computer-readable storage medium is provided, on which a computer program is stored, a processor, when executing the computer program, implements the steps in the embodiments of the method mentioned above.

A general technical person in the field may understand that all or part of the process of implementing the embodiments of the above methods may be accomplished by instructing the relevant hardware through a computer program which may be stored in a non-transitory computer-readable storage medium, when the computer program is executed, the process in the embodiments of the method may be included. Any reference to memory, database or other medium used in the embodiments provided in the present disclosure may include at least one of both non-transitory and transitory memory. The non-transitory memory may include Read-Only memory (ROM), magnetic tape, floppy disk, flash memory, optical storage, High-density embedded non-transitory memory, resistive Random Access Memory (ReRAM), magnetoresistive Random Access Memory (MRAM), Ferroelectric Random Access Memory (FRAM), Phase Change Memory (PCM), graphene memory, etc. The transitory memory may include a Random Access Memory (RAM) or an external cache memory, etc. As an illustration rather than a limitation, RAM can take many forms, such as a Static Random Access Memory (SRAM) or a Dynamic Random Access Memory (DRAM), etc. The databases involved in the embodiments of the present disclosure may include at least one of both relational and non-relational databases. The non-relational database may include a blockchain-based distributed database, etc., but is not limited to this. The processor involved in the embodiments provided in the disclosure may be a general purpose processor, a central processing processor, a graphics processor, a digital signal processor, a programmable logic, a data processing logic based on quantum computing, etc., which is not limited herein.

The technical features of the above embodiments can be combined at will. For the sake of concise description, not all possible combinations of the technical features in the above embodiments are described. However, as long as there is no contradiction in the combination of these technical features, they should be considered to be the scope of the specification.

The above embodiments merely show some implementation modes of the present disclosure, and descriptions thereof are more specific and detailed, but they cannot be construed as limitations to the scope of the present disclosure. It should be noted that those skilled in the art can make a number of variations and improvements without departing from the concept of the present disclosure, and which all fall within the scope of protection of the present disclosure. Therefore, the scope of protection of the present disclosure should be subject to the attached claims.

What is claimed is:

1. A quantum secure direct communication method based on a one-way transmission, applied to a transmitting terminal in a quantum communication system, the quantum secure direct communication method comprising:
   performing error-correction and anti-loss encoding on a to-be-transmitted message, and obtaining a code word corresponding to the to-be-transmitted message;
   encrypting the code word by using an encryption key negotiated with a receiving terminal, and obtaining a ciphertext message corresponding to the encrypted code word; and
   encoding the ciphertext message onto a quantum state, and transmitting quantum state information obtained to the receiving terminal through a quantum channel;
   wherein encoding the ciphertext message onto the quantum state comprises: randomly selecting, by the transmitting terminal, a base vector for each character in the ciphertext message, and encoding the character to convert the character into the quantum state information.

2. The quantum secure direct communication method according to claim 1, before the encoding the ciphertext message onto the quantum state, further comprising:
   performing mask processing on the ciphertext message by using a local random number, and obtaining a to-be-transmitted code word corresponding to the ciphertext message, the local random number and the ciphertext message having the same length;
   wherein the encoding the ciphertext message onto the quantum state and transmitting the quantum state information obtained to the receiving terminal through the quantum channel comprises:
   encoding the to-be-transmitted code word onto the quantum state, and transmitting the quantum state information obtained to the receiving terminal through the quantum channel.

3. The quantum secure direct communication method according to claim 2, after the transmitting the quantum state information obtained to the receiving terminal through the quantum channel, further comprising:
   acquiring a trigger bit timing sequence position exposed by the receiving terminal, the trigger bit timing sequence position being a timing sequence position where the receiving terminal measures the quantum state transmitted through the quantum channel and obtains the quantum state information;
   determining a target timing sequence position in the trigger bit timing sequence position, the target timing sequence position being a timing sequence position where a base vector used by the transmitting terminal to encode the to-be-transmitted code word is the same as a base vector used by the receiving terminal to receive the measured quantum state information; and
   performing an eavesdropping detection on the quantum channel based on the target timing sequence position.

4. The quantum secure direct communication method according to claim 3, wherein the performing the eavesdropping detection on the quantum channel based on the target timing sequence position comprises:
   acquiring a decoding result corresponding to a partial timing sequence position of the target timing sequence position exposed by the receiving terminal;
   comparing a to-be-transmitted bit of the partial timing sequence position to the decoding result of the partial timing sequence position, and calculating a bit error rate of the quantum channel;
   determining, when the bit error rate is greater than a preset threshold, the eavesdropping detection of the quantum channel to fail; and
   determining, when the bit error rate is less than the preset threshold, the eavesdropping detection of the quantum channel to pass.

5. The quantum secure direct communication method according to claim 3, wherein the determining the target timing sequence position in the trigger bit timing sequence position comprises:
   acquiring a first base vector exposed by the receiving terminal and used when receiving quantum state information corresponding to the trigger bit timing sequence position;
   comparing a second base vector used when encoding the to-be-transmitted code word corresponding to the trigger bit timing sequence position to the first base vector; and
   determining a timing sequence position where the first base vector is the same as the second base vector as the target timing sequence position.

6. The quantum secure direct communication method according to claim 3, after passing the eavesdropping detection, further comprising:

exposing a sub-random number corresponding to the trigger bit timing sequence position in the local random number to the receiving terminal, the sub-random number being configured to perform, by the receiving terminal, a unmasking processing on the decoding result corresponding to the trigger bit timing sequence position.

7. The quantum secure direct communication method according to claim 3, wherein the encrypting the code word by using the encryption key negotiated with the receiving terminal and obtaining the ciphertext message corresponding to the code word comprises:
extracting an encryption key with the same length as the code word from a preset key pool, and performing one-time pad encryption processing on the code word.

8. The quantum secure direct communication method according to claim 7, further comprising:
returning an encryption character corresponding to a non-trigger bit timing sequence position except the trigger bit timing sequence position in the encryption key and configured to encrypt the code word after the error-correction and anti-loss encoding, to the key pool.

9. The quantum secure direct communication method according to claim 7, further comprising:
inputting the ciphertext message corresponding to the target timing sequence position into a preset key generation algorithm to obtain a supplementary key; and
adding the supplementary key into the preset key pool.

10. The quantum secure direct communication method according to claim 1, wherein the performing the error-correction and anti-loss encoding on the to-be-transmitted message and obtaining the code word corresponding to the to-be-transmitted message comprises:
performing error-correction encoding processing with a preset error correction algorithm on the to-be-transmitted message;
performing spread spectrum processing on the to-be-transmitted message after the error-correction encoding processing, and obtaining the code word corresponding to the to-be-transmitted message.

11. A quantum secure direct communication method based on a one-way transmission, applied to a receiving terminal in a quantum communication system, the quantum secure direct communication method comprising:
receiving quantum state information transmitted by a transmitting terminal through a quantum channel, the quantum state information being obtained by encoding ciphertext information encoded onto a quantum state after the ciphertext information is obtained by performing the error-correction and anti-loss encoding and the encryption on the to-be-transmitted message by the transmitting terminal, wherein encoding the ciphertext message onto the quantum state comprises: randomly selecting, by the transmitting terminal, a base vector for each character in the ciphertext message, and encoding the character to convert the character into the quantum state information;
decoding the quantum state information to obtain a decoding result;
performing decryption processing on the decoding result by using an encryption key negotiated with the transmitting terminal, and obtaining a decrypted message corresponding to the decoding result; and
performing transcoding processing corresponding to the error-correction and anti-loss encoding on the decrypted message, and obtaining a transmission message corresponding to the decrypted message.

12. The quantum secure direct communication method according to claim 11, wherein the receiving the quantum state information transmitted by the transmitting terminal through the quantum channel comprises:
measuring the quantum state transmitted through the quantum channel according to a preset time window, and obtaining the quantum state information.

13. The quantum secure direct communication method according to claim 12, wherein the quantum state information is encoded onto the quantum state after the transmitting terminal performs a mask processing on the to-be-transmitted message with a local random number, and the method further comprises:
acquiring a sub-random number corresponding to a trigger bit timing sequence position returned by the transmitting terminal, wherein the sub-random number refers to a partial numerical value corresponding to the trigger bit timing sequence position in the local random number determined by the transmitting terminal, and the trigger bit timing sequence position refers to a timing sequence position where the quantum state information is detected; and
performing the unmasking processing on the decoding result corresponding to the trigger bit timing sequence position with the sub-random number.

14. The quantum secure direct communication method according to claim 13, further comprising:
copying the decoding result corresponding to the target timing sequence position to obtain an initial code, wherein the target timing sequence position refers to a timing sequence position where a base vector used by the transmitting terminal to encode the to-be-transmitted code word is the same as a base vector used by the receiving terminal to receive the measured quantum state information;
inputting the initial code into a preset key generation algorithm to obtain a supplementary key; and
adding the supplementary key into a preset key pool.

15. A quantum secure direct communication apparatus based on a one-way transmission, applied to a transmitting terminal in a quantum communication system, the quantum secure direct communication apparatus comprising:
a first encoding module, configured to perform error-correction and anti-loss encoding on a to-be-transmitted message and obtain a code word corresponding to the to-be-transmitted message;
an encryption module, configured to encrypt the code word with an encryption key negotiated with a receiving terminal and obtain a ciphertext message corresponding to the encrypted code word; and
a second encoding module, configured to randomly select a base vector for each character in the ciphertext message, encode the character to convert the character into quantum state information, and transmit the quantum state information obtained to the receiving terminal through a quantum channel.

16. A quantum secure direct communication apparatus based on a one-way transmission, applied to a receiving terminal in a quantum communication system, the quantum secure direct communication apparatus comprising:
a receiving module, configured to receive quantum state information transmitted by a transmitting terminal through a quantum channel, wherein the quantum state information is obtained by encoding ciphertext information onto a quantum state after the ciphertext information is obtained by performing the error-correction and anti-loss encoding and an encryption on the to-betransmitted message by the transmitting terminal, wherein encoding the ciphertext message onto the quantum state comprises: randomly selecting, by the transmitting terminal, a base vector for each character in the ciphertext message, and encoding the character to convert the character into the quantum state information;

a decoding module, configured to decode the quantum state information to obtain a decoding result;

a decryption module, configured to perform decryption processing on the decoding result by using an encryption key negotiated with the transmitting terminal, and obtain a decrypted message corresponding to the decoding result; and a transcoding module, configured to perform transcoding processing corresponding to the error-correction and anti-loss encoding on the decrypted message, and obtain a transmission message corresponding to the decrypted message.

17. A communication device, comprising a processor and a memory for storing a computer program, wherein the processor, when executing the computer program, implements the quantum secure direct communication method of claim 1.

18. A communication device, comprising a processor and a memory for storing a computer program, wherein the processor, when executing the computer program, implements the quantum secure direct communication method of claim 11.

19. A communication system, comprising a transmitting terminal and a receiving terminal, wherein the transmitting terminal is the communication device of claim 17.

20. A communication system, comprising a transmitting terminal and a receiving terminal, wherein the receiving terminal is the communication device of claim 18.

* * * * *